(12) United States Patent
Krishnamoorthy et al.

(10) Patent No.: US 12,013,748 B2
(45) Date of Patent: Jun. 18, 2024

(54) INTELLIGENT QUALITY ACCELERATOR WITH ROOT MAPPING OVERLAY

(71) Applicant: BANK OF AMERICA CORPORATION, Charlotte, NC (US)

(72) Inventors: Madhusudhanan Krishnamoorthy, Tamil Nadu (IN); Nagar Parthasarathi Varadarajan, Hyderabad (IN); Deepika Sehgal, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 431 days.

(21) Appl. No.: 17/342,678

(22) Filed: Jun. 9, 2021

(65) Prior Publication Data

US 2022/0398523 A1 Dec. 15, 2022

(51) Int. Cl.
| | |
|---|---|
| *G06F 11/00* | (2006.01) |
| *G06F 11/07* | (2006.01) |
| *G06F 16/22* | (2019.01) |
| *G06F 16/242* | (2019.01) |
| *G06F 16/2455* | (2019.01) |
| *G06N 3/049* | (2023.01) |
| *G06Q 10/0639* | (2023.01) |

(52) U.S. Cl.
CPC .......... *G06F 11/079* (2013.01); *G06F 16/221* (2019.01); *G06F 16/2445* (2019.01); *G06F 16/24564* (2019.01); *G06N 3/049* (2013.01); *G06Q 10/06395* (2013.01)

(58) Field of Classification Search
USPC ........................................................ 707/600
See application file for complete search history.

(56) References Cited

U.S. PATENT DOCUMENTS

| | | | | |
|---|---|---|---|---|
| 9,495,331 | B2 * | 11/2016 | Govrin | G06F 40/00 |
| 11,477,667 | B2 * | 10/2022 | Cummings | H04L 67/51 |
| 11,640,565 | B1 * | 5/2023 | Pfeiler | G06Q 10/0631 |
| | | | | 705/7.12 |
| 2007/0263550 | A1 * | 11/2007 | Perng | H04L 41/5003 |
| | | | | 370/252 |
| 2008/0208875 | A1 * | 8/2008 | Friedlander | G06Q 10/10 |
| 2012/0089410 | A1 * | 4/2012 | Mikurak | G06Q 10/00 |
| | | | | 705/1.1 |
| 2014/0075004 | A1 * | 3/2014 | Van Dusen | G06F 16/90335 |
| | | | | 709/223 |

(Continued)

OTHER PUBLICATIONS

Ain, Qurat Tul, et al. "Sentiment analysis using deep learning techniques: a review." International Journal of Advanced Computer Science and Applications 8.6 (2017). (Year: 2017).*

(Continued)

*Primary Examiner* — Gurkanwaljit Singh
(74) *Attorney, Agent, or Firm* — Moore & Van Allen PLLC; Nicholas C. Russell

(57) ABSTRACT

Embodiments of the invention are directed to a system, method, or computer program product for providing an intelligent quality accelerator with root mapping system. The system provides a business language model and process automation that stratifies sampling of resource exchanges from products using a machine learning loop and provides an end to end simulation for root cause analysis. In this way, the system provides two layers, a robust sampling and root cause analysis.

15 Claims, 4 Drawing Sheets

(56) References Cited

U.S. PATENT DOCUMENTS

| | | | | |
|---|---|---|---|---|
| 2014/0297268 A1* | 10/2014 | Govrin | ............... | G06N 5/02 |
| | | | | 704/9 |
| 2015/0170053 A1* | 6/2015 | Miao | ............... | G06N 20/00 |
| | | | | 706/12 |
| 2020/0320080 A1* | 10/2020 | Almasan | ............... | G06F 16/903 |
| 2021/0081848 A1* | 3/2021 | Polleri | ............... | G06F 8/77 |
| 2022/0277075 A1* | 9/2022 | Cummings | ............... | H04W 48/16 |

OTHER PUBLICATIONS

Wang, Chongren, et al. "A deep learning approach for credit scoring of peer-to-peer lending using attention mechanism LSTM." IEEE Access 7 (2018): 2161-2168. (Year: 2018).*

Huo, Yujia, et al. "Knowledge modeling via contextualized representations for LSTM-based personalized exercise recommendation." Information Sciences 523 (2020): 266-278. (Year: 2020).*

Socher, Richard, et al. "Semantic compositionality through recursive matrix-vector spaces." Proceedings of the 2012 joint conference on empirical methods in natural language processing and computational natural language learning. 2012. (Year: 2012).*

* cited by examiner

INTELLIGENT QUALITY ACCELERATOR WITH ROOT MAPPING OVERLAY

BACKGROUND

Typically in entity to entity resource exchanges post production quality assurance is required for ensuring that the exchange is performed and validated. However, practically there are issues in how to sample a correct set of resource exchanges from an overall product line and how to validate the process effectively. With advancements in technology, a need exists for an intelligent quality accelerator with root mapping.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Currently there are issues in how to sample a correct set of resource exchanges from an overall product line and how to validate the process effectively. These are typically selected randomly and do not involve a method of selection. As there are some resource exchanges that are error prone, sensitive, or otherwise vulnerable in nature that will affect sampling for quality insurance. Sampling the resource exchange requires users to have small to medium enterprise knowledge and knowledge of historical incidents and incident frequency. With respect to validation the user is required to source data from both systems for business information transfer is correct between the two systems from the two entities. Any missing data between these steps end up in severe quality issues.

Embodiments of the present invention address the above needs and/or achieve other advantages by providing apparatuses (e.g., a system, computer program product and/or other devices) and methods for providing an intelligent quality accelerator with root mapping system. The system provides a business language model and process automation that stratifies sampling of resource exchanges from products using a machine learning loop and provides an end to end simulation for root cause analysis. In this way, the system provides two layers, a robust sampling and root cause analysis.

The system provides a robust sample extraction method for providing appropriate sampling for quality insurance review. In this way, the system allows for comparison between a sample input and an entity resource exchange for quality review of the entity resource exchange post production. This quality insurance confirms the correct processing of the entity resource exchange.

Furthermore, the system validates the root cause of an error occurring within the resource exchange and provides a recommendation for mitigation of the root cause. The data also allows for identification of vulnerable or robust resource exchanges for future production reviews.

Embodiments of the invention are directed to a system, method, or computer program product for an intelligent quality accelerator with root mapping, the invention comprising: presenting a rules interface for sample input extraction from one or more product databases; receiving user selected rules for sample input extraction and extract sample inputs from product databases in accordance with user selected rules and a module comprising a business value metric (BVM), a language model, and a private data governance model to generate sample rules; converting the sample rules into sequel statements and apply the sequel statements against the product databases to extract the sample inputs; converting the sample inputs into graphical format and overlay the sample input against a current resource exchange; identifying a node of divergence between the graphical format of the sample inputs and the current resource exchange; translating the node of divergence to a vector for root cause identification; and presenting the root cause identification to the user along with a recommendation based on historic tested results.

In some embodiments, translating the node of divergence to a vector for root cause identification, further comprises transmitting graphical data to a decoder to decode via a long short term memory model (LSTM), wherein the LSTM model identifies a branch where nodes are deviating and identifies a root cause of the divergence. In some embodiments, a root cause is based on system availability, technical issue, oversight from checker or maker, or data point variance, wherein a recommendation is based on the tested results and is a recommendation on fixing the root cause issue based on historic tested results.

In some embodiments, the module comprises the BVM, wherein the BVM provides a weighted column to each database column that weights columns within the product database with respect to the user selected rules. In some embodiments, the module comprises the language model, wherein the language model reviews resource exchange metadata and cross validates resource exchange rules with the user selected rules and proposes additional sample input extraction for robust quality sample selection. In some embodiments, the module comprises the private data governance model, wherein the private data governance model scans the resulting sample inputs and masks private data within the sample inputs samples allowing the user to view only data for quality control and not be able to view or manipulate private data.

In some embodiments, the product database contains historic entity to entity resource exchanges that are extracted for sample input to test a quality of a current entity to entity resource exchange. In some embodiments, the product database further comprises an incident database and a knowledge database, wherein the incident database keeps track of previous errors and quality issues with different transactions that have been reviewed, wherein the knowledge database stores metadata for transaction rules and the user input and allow for configuration.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
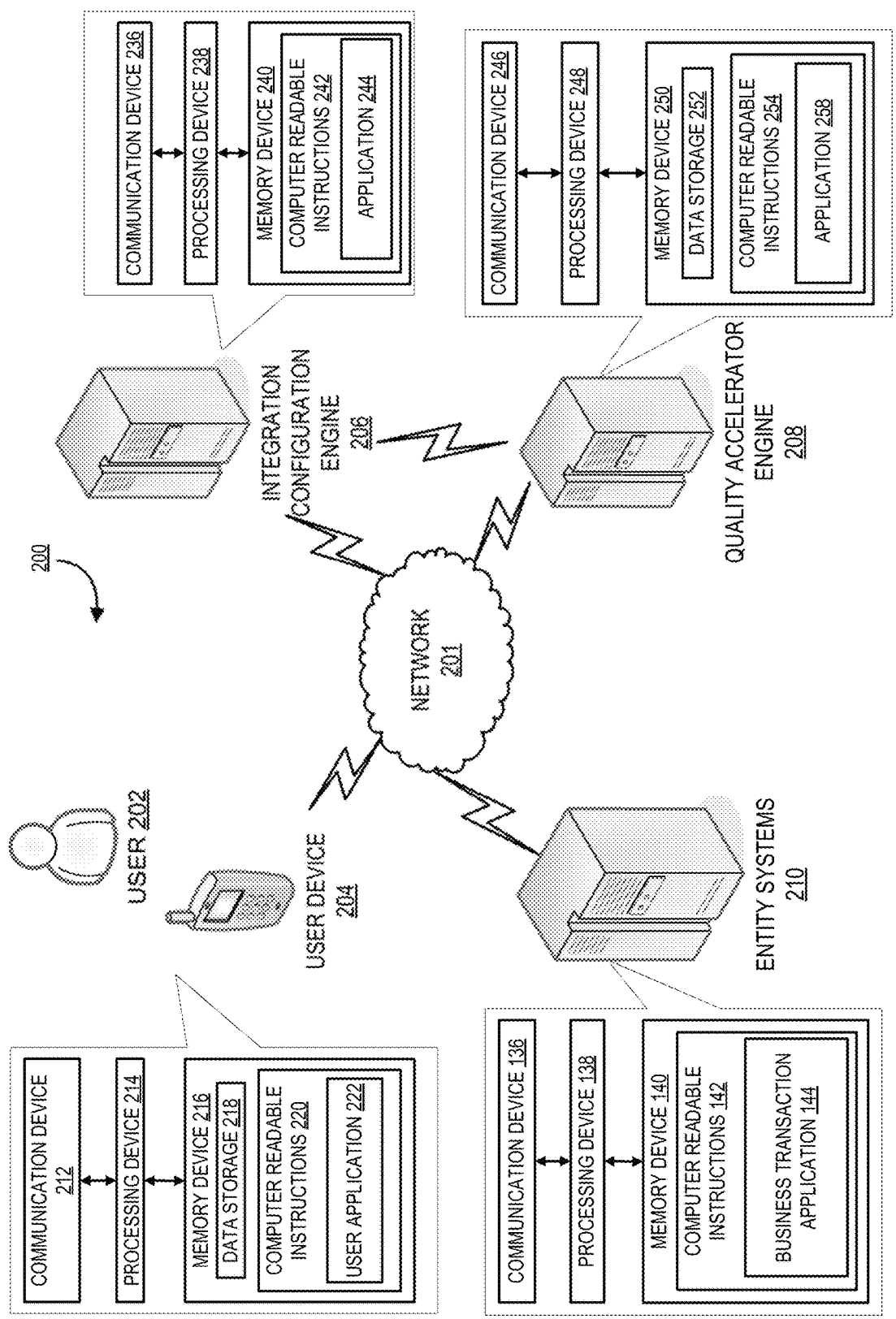
Figure 2:
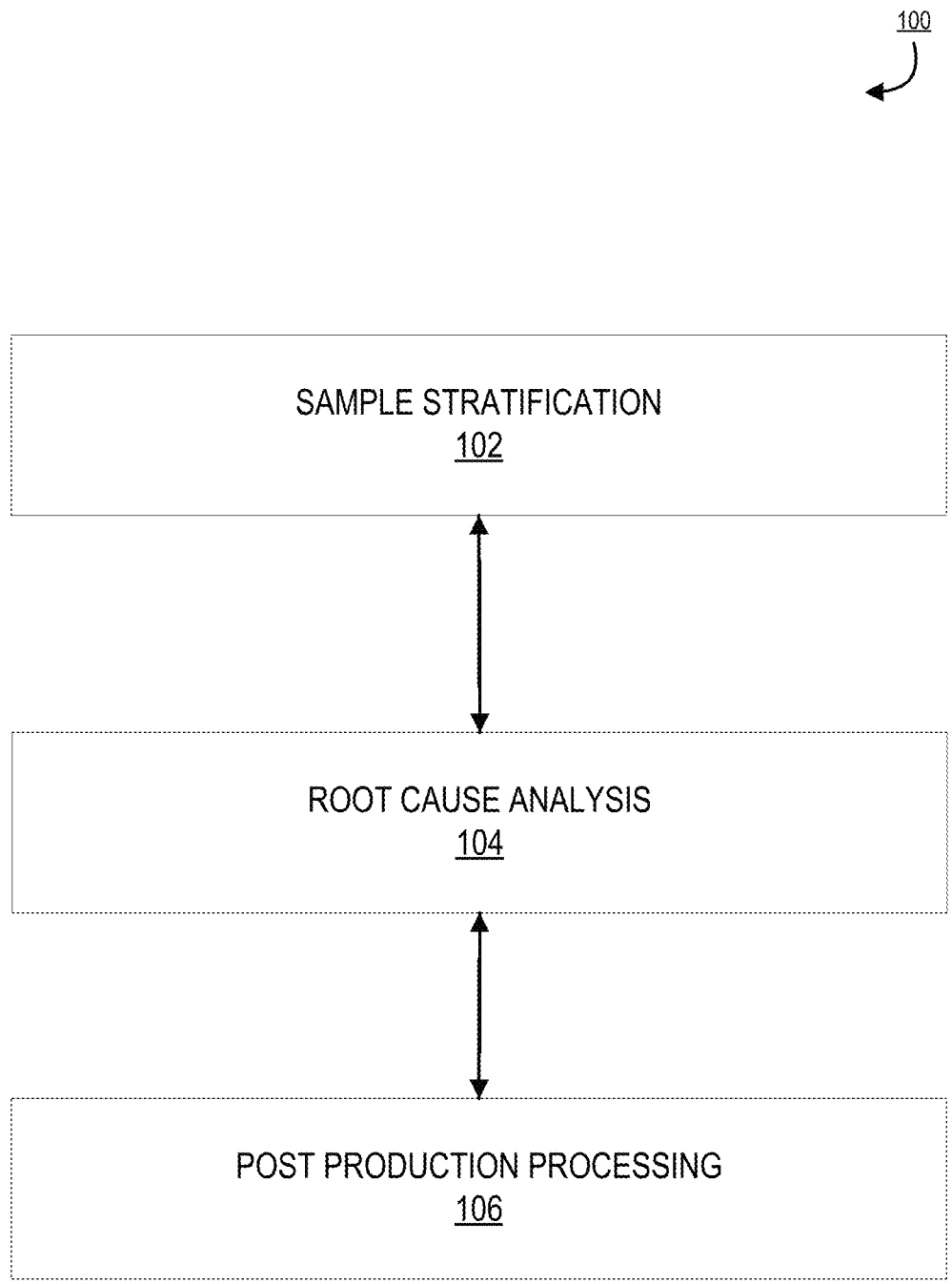
Figure 3:
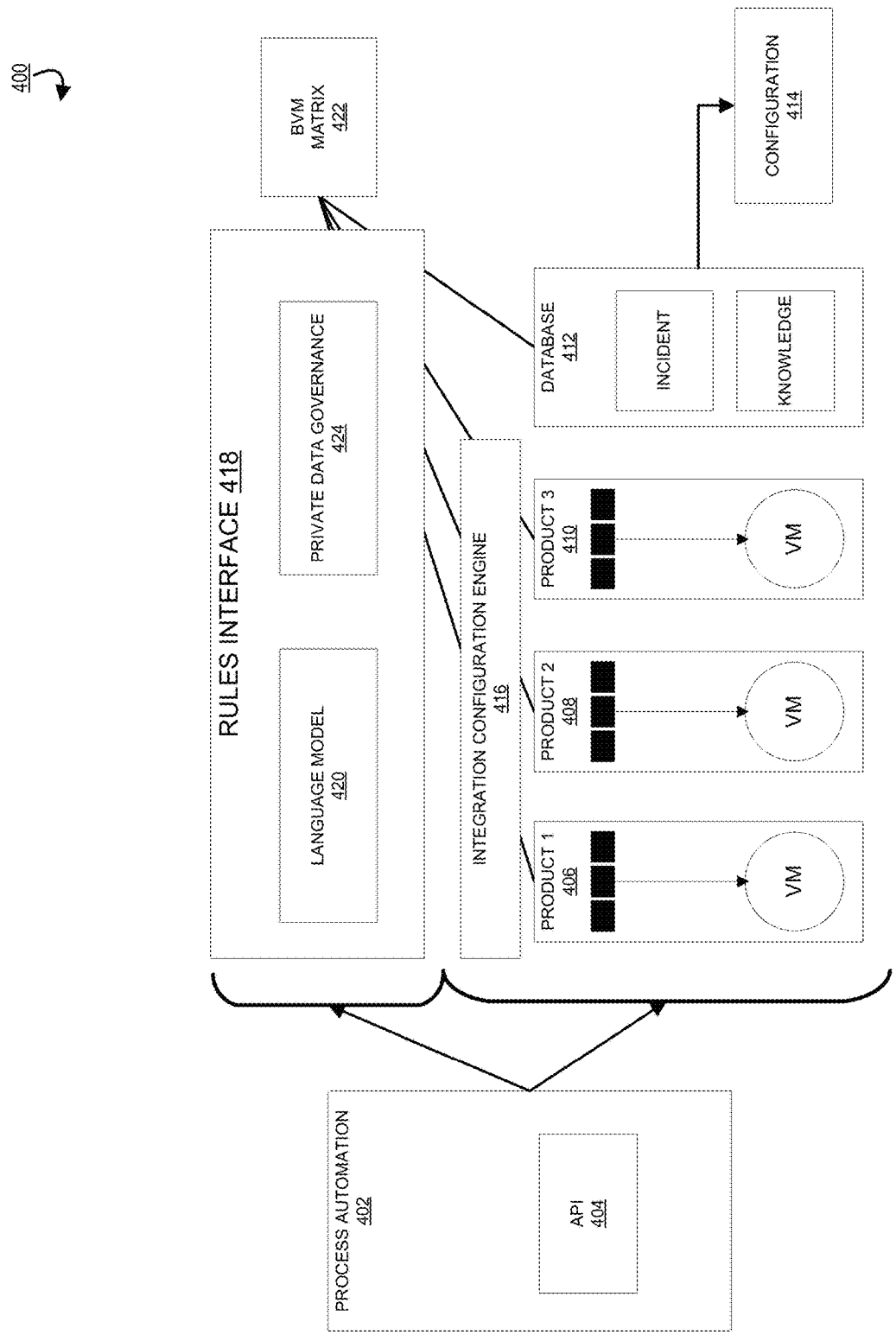
Figure 4:
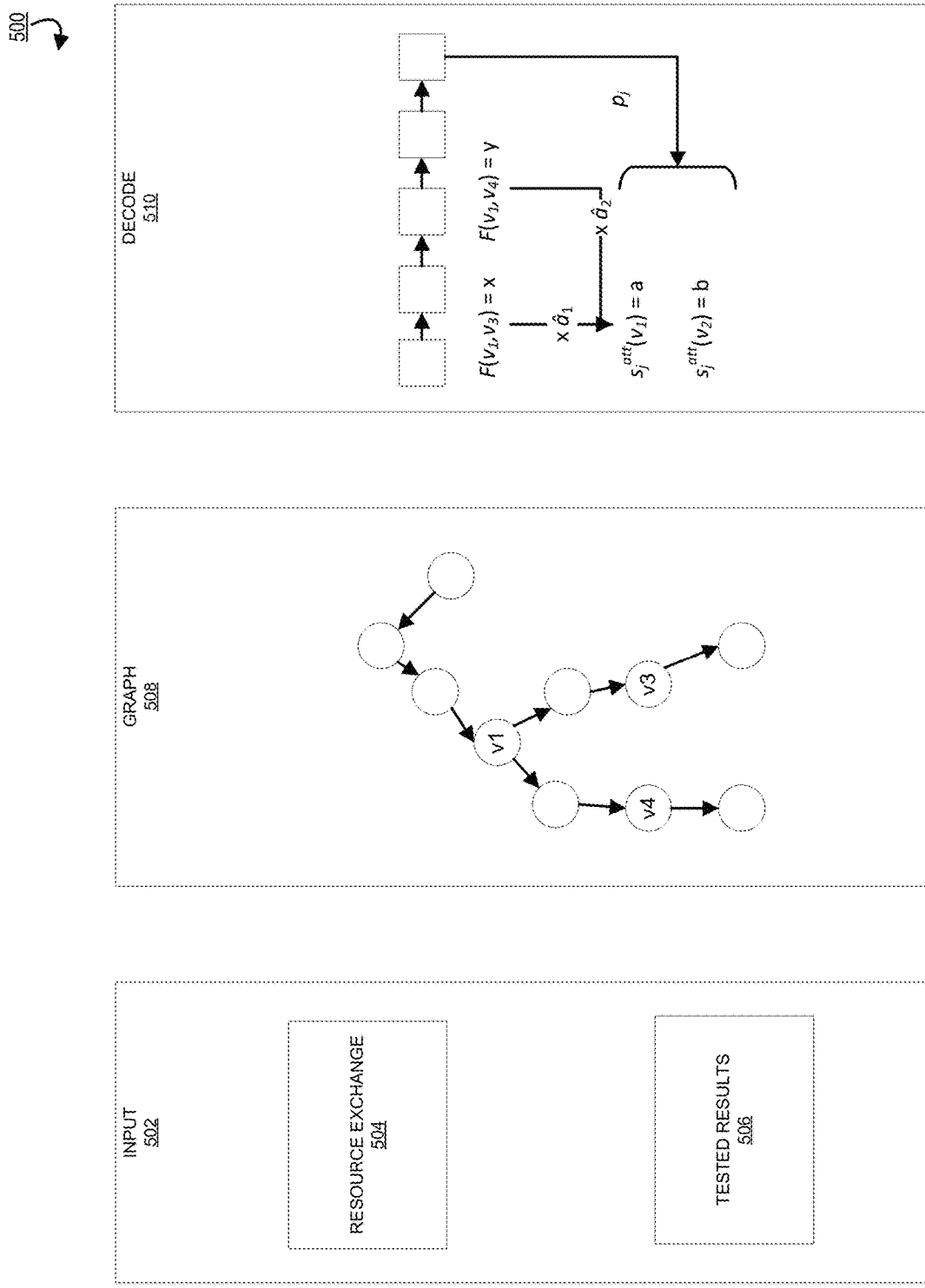

Having thus described embodiments of the invention in general terms, reference will now be made to the accompanying drawings, wherein:

FIG. 1 provides an intelligent quality accelerator system environment, in accordance with one embodiment of the present invention;

FIG. 2 illustrates a high level process flow of the steps within the intelligent quality accelerator process, in accordance with one embodiment of the invention;

FIG. 3 illustrates a high level process flow of stratifying sampling of resource exchanges using business language modeling and process automation, in accordance with one embodiment of the invention; and FIG. 4 illustrates a high level process flow of calculating root cause resource exchange quality variables, in accordance with one embodiment of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to a system, method, or computer program product for an intelligent quality accelerator with root mapping system. The system provides a business language model and process automation that stratifies sampling of resource exchanges from products using a machine learning loop and provides an end to end simulation for root cause analysis. In this way, the system provides two layers, a robust sampling and root cause analysis.

As used herein, a "user" may be an entity user or an individual that integrated or otherwise utilized the applications disclosed herein. A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. In some embodiments, the term "platform" including the temporal platform may refer to a platform that is used as a base upon which other applications, processing, or technologies are distributed including applications, activities, integration into currently used applications, integration into systems, presentation of user interfaces, and the like.

Further, the embodiments described herein may refer to use of a resource exchange. Unless specifically limited by the context, a resource exchange is a transaction between two entities or businesses. In some embodiments, for example, a transaction may refer to a purchase of goods or services, a return of goods or services, a payment transaction, a credit transaction, or other interaction involving an entity bank account. In some embodiments, a transaction may include one or more of the following: purchasing, renting, selling, and/or leasing goods and/or services; withdrawing cash; making payments to creditors; sending remittances; transferring balances from one account to another account; loading money onto stored value cards (SVCs) and/or prepaid cards; donating to charities; and/or the like.

Furthermore, the term "product" or "account" as used herein may include any financial product, service, or the like that may be provided to a user from an entity that subsequently requires payment. A product may include an account, credit, loans, purchases, agreements, or the like between an entity and a user. The term "relationship" as used herein may refer to any products, communications, correspondences, information, or the like associated with a user that may be obtained by an entity while working with a user. User relationship data may include, but is not limited to addresses associated with a user, user contact information, user associate information, user products, user products in arrears, or other information associated with the user's one or more accounts, loans, products, purchases, agreements, or contracts that a user may have with the entity.

FIG. 1 provides an intelligent quality accelerator system environment 200, in accordance with one embodiment of the present invention. As illustrated in FIG. 1, the quality acceleration engine 208 is operatively coupled, via a network 201 to the user device 204, to the integration configuration engine 206, and to entity systems 210. In this way, the quality acceleration engine 208 can send information to and receive information from the user device 204, the integration configuration engine 206, and the entity systems 210. FIG. 1 illustrates only one example of the system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

As illustrated in FIG. 1, the quality acceleration engine 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the integration configuration engine 206, the user device 204, and the entity systems 210. As such, the communication device 246 generally comprises a modem, server, or other device for communicating with other devices on the network 201.

As further illustrated in FIG. 1, the quality acceleration engine 208 comprises computer-readable instructions 254 stored in the memory device 250, which in one embodiment includes the computer-readable instructions 254 of an application 258. In some embodiments, the memory device 250 includes data storage 252 for storing data created and/or used by the application 258. In the embodiment illustrated in FIG. 1 and described throughout much of this specification, the application 258 may perform the functions disclosed herein.

As illustrated in FIG. 1, the integration configuration engine 206 generally comprises a communication device 236, a processing device 238, and a memory device 240. As further illustrated in FIG. 1, the integration configuration engine 206 comprises computer-readable instructions 242 stored in the memory device 240, which in one embodiment includes the computer-readable instructions 242 of an application 244.

In the embodiment illustrated in FIG. 1, the application 244 allows the integration configuration engine 206 to be linked to the quality acceleration engine 208 to communicate, via a network 201, the information related to transactions associated with entity systems 210.

FIG. 1 also illustrates a user device 204. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the integration configuration engine 206, the quality acceleration engine 208, and the entity systems 210. As such, the communication device 212 generally comprises a modem, server, or other device for communicating with other devices on the network 201.

As further illustrated in FIG. 1, the user device 204 comprises computer-readable instructions 220 stored in the memory device 216, which in one embodiment includes the computer-readable instructions 220 of a user application 222. In this way, a user 202 may be able gain access to the rules interface to set one or more rules for sampling, to activate and review root cause analysis and/or the like using the user application 222. A "mobile device" 204 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, laptop computers, cameras, video recorders, audio/video player, radio, GPS devices, any combination of the aforementioned, or the like. Although only a single user device 204 is depicted in FIG. 1, the payment account determination system environment 200 may contain numerous mobile devices 204.

The entity systems 210 are operatively coupled to the quality acceleration engine 208, the integration configuration engine 206, and/or the user device 204 through the network 201. The entity systems 210 have systems with devices the same or similar to the devices described for the quality acceleration engine 208, the integration configuration engine 206, and/or the user device 204 (i.e., communication device, processing device, and memory device). Therefore, the entity systems 210 communicate with the quality acceleration engine 208, the integration configuration engine 206, and/or the user device 204 in the same or similar way as previously described with respect to each system.

As such, the entity systems 210 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 201 and other devices on the network 201. As such, the communication device 136 generally comprises a modem, server, wireless transmitters or other devices for communicating with devices on the network 2001. The memory device 140 typically comprises a non-transitory computer readable storage medium, comprising computer readable/executable instructions/code, such as the computer-readable instructions 142, as described below.

As further illustrated in FIG. 1, the entity system 210 comprises computer-readable instructions 142 or computer readable program code 142 stored in the memory device 140, The computer readable instructions 142, when executed by the processing device 138 are configured to cause the processing device 138 to perform one or more steps described in this disclosure such as to perform a resource exchange with another entity. In some embodiments, the memory device 140 includes a data storage for storing data related to entity transactions and resource entity information.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a high level process flow of the steps within the intelligent quality accelerator process 100, in accordance with one embodiment of the invention. As illustrated in block 102, the system provides for sample stratification. Currently there are issues in how to sample a correct set of resource exchanges from an overall product line and how to validate the process effectively. These are typically selected randomly and do not involve a method of selection. As there are some resource exchanges that are error prone, sensitive, or otherwise vulnerable in nature that will effect sampling for quality insurance.

The system provides sample stratification in the form of a business language model and process automation that stratifies sampling of resource exchanges from products using a machine learning loop as further illustrated below in FIG. 3.

The system provides a robust sample extraction method for providing appropriate sampling for quality insurance review. In this way, the system allows for comparison between a sample input and an entity resource exchange for quality review of the entity resource exchange post production. This quality insurance confirms the correct processing of the entity resource exchange.

As illustrated in block 104, the process 100 further includes a root cause analysis mapping. With respect to validation the user is required to source data from both systems for business information transfer is correct between the two systems from the two entities. Any missing data between these steps end up in severe quality issues. In this way, the system allows for comparison between a sample input and an entity resource exchange for quality review of the entity resource exchange post production. This quality insurance confirms the correct processing of the entity resource exchange. This is further illustrated below in FIG. 4.

Furthermore, the system validates the root cause of an error occurring within the resource exchange and provides a recommendation for mitigation of the root cause. The data also allows for identification of vulnerable or robust resource exchanges for future production reviews.

Finally, as illustrated in block 106, the system provides a machine learning post product processing recommendation for remediation of any variables in the sample selection and quality review.

FIG. 3 illustrates a high level process flow of stratifying sampling of resource exchanges using business language modeling and process automation 400, in accordance with one embodiment of the invention. The system provides a robust sample extraction method for providing appropriate sampling for quality insurance review. In this way, the system allows for comparison between a sample input and an entity resource exchange for quality review of the entity resource exchange post production. This quality insurance confirms the correct processing of the entity resource exchange.

Using the application programming interface (API) 404 of the process automation 402, a user is granted access to a rules interface 418. The rules interface 418, is a resource exchange interface that is provided to a user device for a user to set up initial rules for extracting resource exchanges for various previous resource exchange products for sampling. In this way, the rules interface 418 allows for a user to select a type of resource exchange, a location, an amount, a vulnerability, an entity associated with the resource exchange or the like. As such, the rules interface 418 allows the user to set up rules for extraction of samples for analysis. The rules interface 418 further comprises modules. These include a language model 420, private data governance module 424, and a business value metric (BVM) with a weight matrix 422.

In a resource exchange, not all columns have equal weight, there might be some columns that have more weight such as the country, amount, type, vulnerability, or the like. The BVM matrix 422 is automatically applied on top of the transaction rules that the user sets up. This weights the resource exchanges based on the user inputs on the rules interface 418.

The language model 420 provides an external intelligence on top of what the user has inputted in the rules interface. The user may be selecting resource exchange based on rules, but not know dated transactions or vulnerable ones. The language model 420 reviews resource exchange metadata and cross validates the resource exchange rules with the user selection and provides recommendations to user for rules input to ensure robust quality sample selection. The user may be able to approve the selection and the system may apply the rules to the product databases.

The private data governance module 424 scans the resulting samples and masks private data within those samples allowing the user to view only data for quality control and not be able to view or manipulate potential private data.

Once the user selects the rules for extracting the samples via the rules interface 418, the language model 420 performs adjustments to the user selection and allows the user to approve the rules. Once approved, the system may properly weigh the resource exchange samples via the BVM matrix 422. The integration configuration engine 416 then converts the rules into sequel statements and applied against the databases to download the samples.

The resource exchange databases that contain the various entity resource exchange products are illustrated as Product 1 406, Product 2 408, and Product 3 410. These various products are stored within the product database and comprise information about previously processed resource exchanges between the entities.

The system extracts the samples based on the integration configuration engine 416 converting the rules into sequel statements and applied against the databases to download the samples. Once the samples are identified, the private data governance masks the privacy data that the user does not need to see for quality control analysis. The samples are then transmitted to the user for analysis, which is further illustrated below in FIG. 4.

The database 412 comprises the incident database and a knowledge database. The incident database keeps track of previous errors or quality issues with different transactions that have been reviewed. The knowledge database stores metadata for transaction rules and the user input and allow for configuration 414 via the system.

FIG. 4 illustrates a high level process flow of calculating root cause resource exchange quality variables 500, in accordance with one embodiment of the invention. Once the sample resource exchanges are selected the system continues to calculate root cause. At a high level the system provides schema that is converted to a graph, the graph is softly pruned conditioned on the input and a graph neural network is generated that represents nodes that are aware of the global schema structure.

As illustrated in block 502 inputs are provided into the system. These inputs include resource exchanges 504 and tested results 506. Resource exchanges 504 are the real entity transactions that were carried out by a maker and a checker. The tested results 506 are the samples that were generated above with respect to FIG. 3.

These two types of resource exchanges are then compiled and converted into a graph, as illustrated in block 508. As illustrated in block 508, there are two branches to the graph, the one on the left is the resource exchange and the branch on the left is the tested results. As illustrated, there is a single node point for both graphs up until v1. In this way, until v1 both the resource exchange and the tested results match. At the v1 node, the graphs diverges and bifurcates. This graphical node point illustrates the diverges or difference between the resource exchange and the tested results.

Once the graph is created it will be translated into a mathematical vector. As illustrated in block 510 the graphical data is then transmitted to a decoder to decode the data. This is done via a long short term memory model (LSTM). The LSTM model will identify the branch where the nodes are deviating and identifies the root cause of the divergence. This is done by identifying the parent node where the divergence occurs. The LSTM will decode the entire parent node to a specific language module to calculate the root cause. The root cause is determined based on the graph mapping of $F(v_1,v_3)=x$ and the recommendation is determined based on $F(v_1,v_4)=y$. Both the root cause and the recommendation are then translated and provided to the user. The root cause may be based on system availability, technical issue, oversight from checker or maker, data point variance, or the like. The recommendation is based on the tested results and is a recommendation on fixing the root cause issue based on historic tested results.

The system further provides an encoder and decoder for using the schema representation. The encoder is a weighted average over schema items that was concatenated to every word so that each word is augmented with the graph structure around the schema items it is linked to. The decoder is used when scoring a schema item, the score is dependent on its relationship to the previously decoded schema item.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for an intelligent quality accelerator with root mapping, the system comprising:
a memory device with computer-readable program code stored thereon;
a communication device;
a processing device operatively coupled to the memory device and the communication device, wherein the processing device is configured to execute the computer-readable program code to:
present a rules interface for sample input extraction from one or more product databases;
receive user selected rules for sample input extraction and extract sample inputs from product databases in accordance with user selected rules and a module comprising a business value metric (BVM), a language model, and a private data governance model to generate sample rules, wherein the BVM provides a weighted column to each database column that weights columns within the product database with respect to the user selected rules;
convert the sample rules into sequel statements and apply the sequel statements against the product databases to extract the sample inputs;
convert the sample inputs into graphical format and overlay the sample input against a current resource exchange;
identify a node of divergence between the graphical format of the sample inputs and the current resource exchange;
translate the node of divergence to a vector for root cause identification, wherein translating the node of divergence to the vector for root cause identification further comprises transmitting graphical data to a decoder to decode via a long short term memory model (LSTM), wherein the LSTM model identifies a branch where nodes are deviating and identifies a root cause of the divergence; and
present the root cause identification to the user along with a recommendation based on historic tested results.

2. The system of claim 1, wherein a root cause is based on system availability, technical issue, oversight from checker or maker, or data point variance, wherein a recommendation is based on the tested results and is a recommendation on fixing the root cause issue based on historic tested results.

3. The system of claim 1, wherein the module comprises the language model, wherein the language model reviews resource exchange metadata and cross validates resource exchange rules with the user selected rules and proposes additional sample input extraction for robust quality sample selection.

4. The system of claim 1, wherein the module comprises the private data governance model, wherein the private data governance model scans the resulting sample inputs and masks private data within the sample inputs samples allowing the user to view only data for quality control and not be able to view or manipulate private data.

5. The system of claim 1, wherein the product database contains historic entity to entity resource exchanges that are extracted for sample input to test a quality of a current entity to entity resource exchange.

6. The system of claim 1, wherein the product database further comprises an incident database and a knowledge database, wherein the incident database keeps track of previous errors and quality issues with different transactions that have been reviewed, wherein the knowledge database stores metadata for transaction rules and the user input and allow for configuration.

7. A computer program product for an intelligent quality accelerator with root mapping, the computer program product comprising at least one non-transitory computer-readable medium having computer-readable program code portions embodied therein, the computer-readable program code portions comprising:
an executable portion configured for presenting a rules interface for sample input extraction from one or more product databases;
an executable portion configured for receiving user selected rules for sample input extraction and extract sample inputs from product databases in accordance with user selected rules and a module comprising a business value metric (BVM), a language model, and a private data governance model to generate sample rules, wherein the BVM provides a weighted column to each database column that weights columns within the product database with respect to the user selected rules;
an executable portion configured for converting the sample rules into sequel statements and apply the sequel statements against the product databases to extract the sample inputs;
an executable portion configured for converting the sample inputs into graphical format and overlay the sample input against a current resource exchange;
an executable portion configured for identifying a node of divergence between the graphical format of the sample inputs and the current resource exchange;
an executable portion configured for translating the node of divergence to a vector for root cause identification, wherein translating the node of divergence to the vector for root cause identification further comprises transmitting graphical data to a decoder to decode via a long short term memory model (LSTM), wherein the LSTM model identifies a branch where nodes are deviating and identifies a root cause of the divergence; and
an executable portion configured for presenting the root cause identification to the user along with a recommendation based on historic tested results.

8. The computer program product of claim 7, wherein a root cause is based on system availability, technical issue, oversight from checker or maker, or data point variance, wherein a recommendation is based on the tested results and is a recommendation on fixing the root cause issue based on historic tested results.

9. The computer program product of claim 7, wherein the module comprises the language model, wherein the language model reviews resource exchange metadata and cross validates resource exchange rules with the user selected rules and proposes additional sample input extraction for robust quality sample selection.

10. The computer program product of claim 7, wherein the module comprises the private data governance model, wherein the private data governance model scans the resulting sample inputs and masks private data within the sample inputs samples allowing the user to view only data for quality control and not be able to view or manipulate private data.

11. The computer program product of claim 7, wherein the product database contains historic entity to entity resource exchanges that are extracted for sample input to test a quality of a current entity to entity resource exchange.

12. The computer program product of claim 7, wherein the product database further comprises an incident database and a knowledge database, wherein the incident database keeps track of previous errors and quality issues with different transactions that have been reviewed, wherein the knowledge database stores metadata for transaction rules and the user input and allow for configuration.

13. A computer-implemented method for an intelligent quality accelerator with root mapping, the method comprising:
- providing a computing system comprising a computer processing device and a non-transitory computer readable medium, where the computer readable medium comprises configured computer program instruction code, such that when said instruction code is operated by said computer processing device, said computer processing device performs the following operations:
- presenting a rules interface for sample input extraction from one or more product databases;
- receiving user selected rules for sample input extraction and extract sample inputs from product databases in accordance with user selected rules and a module comprising a business value metric (BVM), a language model, and a private data governance model to generate sample rules, wherein the BVM provides a weighted column to each database column that weights columns within the product database with respect to the user selected rules;
- converting the sample rules into sequel statements and apply the sequel statements against the product databases to extract the sample inputs;
- converting the sample inputs into graphical format and overlay the sample input against a current resource exchange;
- identifying a node of divergence between the graphical format of the sample inputs and the current resource exchange;
- translating the node of divergence to a vector for root cause identification, wherein translating the node of divergence to the vector for root cause identification further comprises transmitting graphical data to a decoder to decode via a long short term memory model (LSTM), wherein the LSTM model identifies a branch where nodes are deviating and identifies a root cause of the divergence; and
- presenting the root cause identification to the user along with a recommendation based on historic tested results.

14. The computer-implemented method of claim 13, wherein a root cause is based on system availability, technical issue, oversight from checker or maker, or data point variance, wherein a recommendation is based on the tested results and is a recommendation on fixing the root cause issue based on historic tested results.

15. The computer-implemented method of claim 13, wherein the product database contains historic entity to entity resource exchanges that are extracted for sample input to test a quality of a current entity to entity resource exchange, wherein the product database further comprises an incident database and a knowledge database, wherein the incident database keeps track of previous errors and quality issues with different transactions that have been reviewed, wherein the knowledge database stores metadata for transaction rules and the user input and allow for configuration.

* * * * *